UNITED STATES PATENT OFFICE.

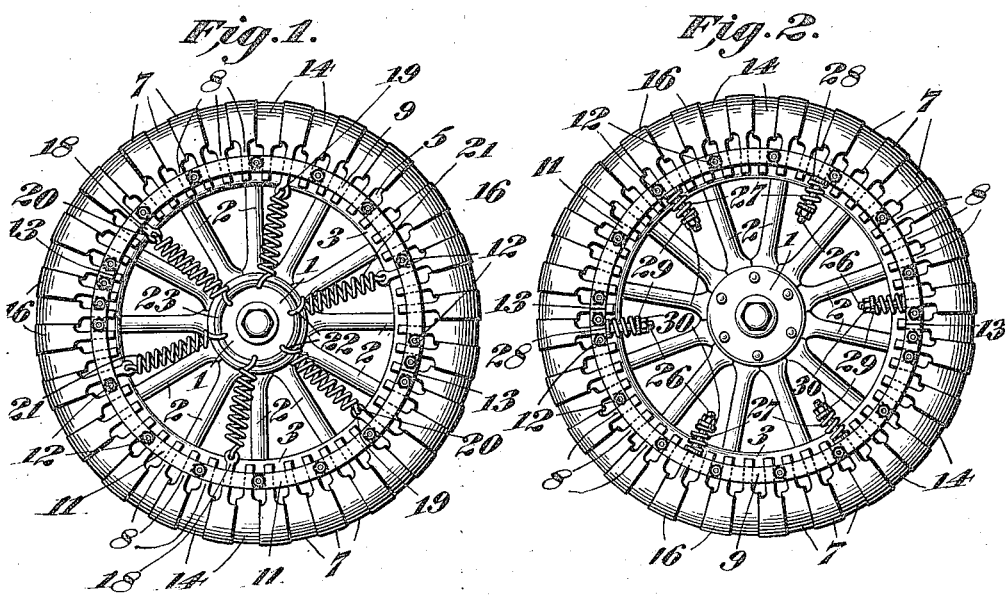
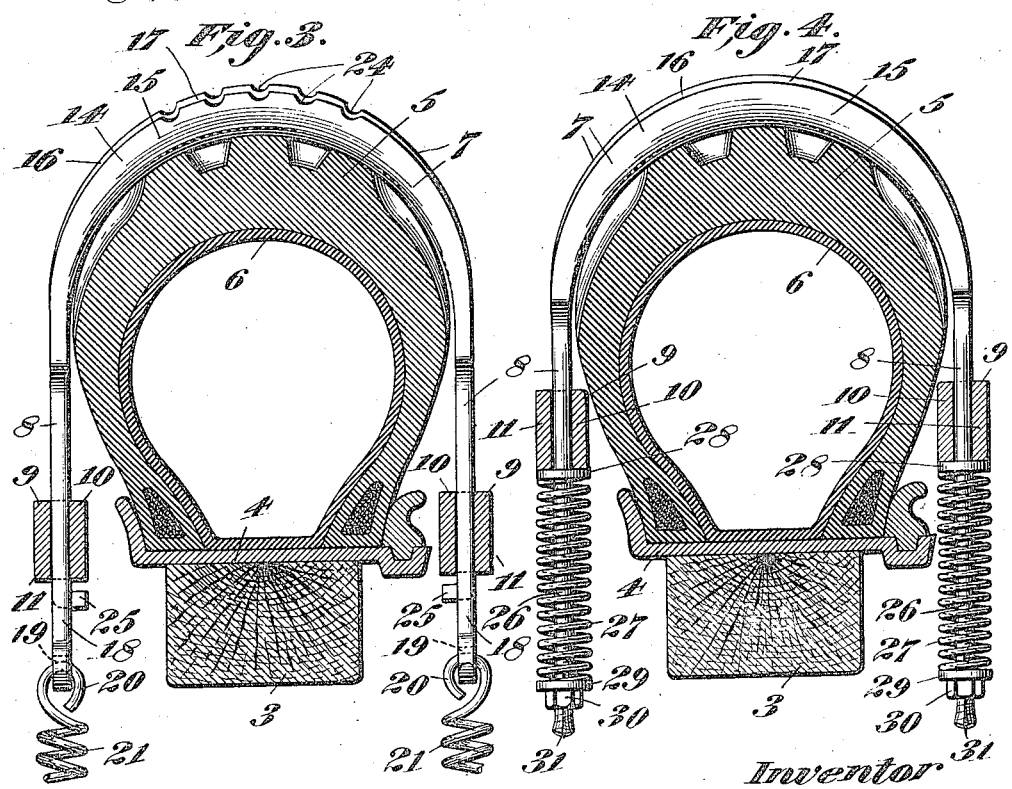

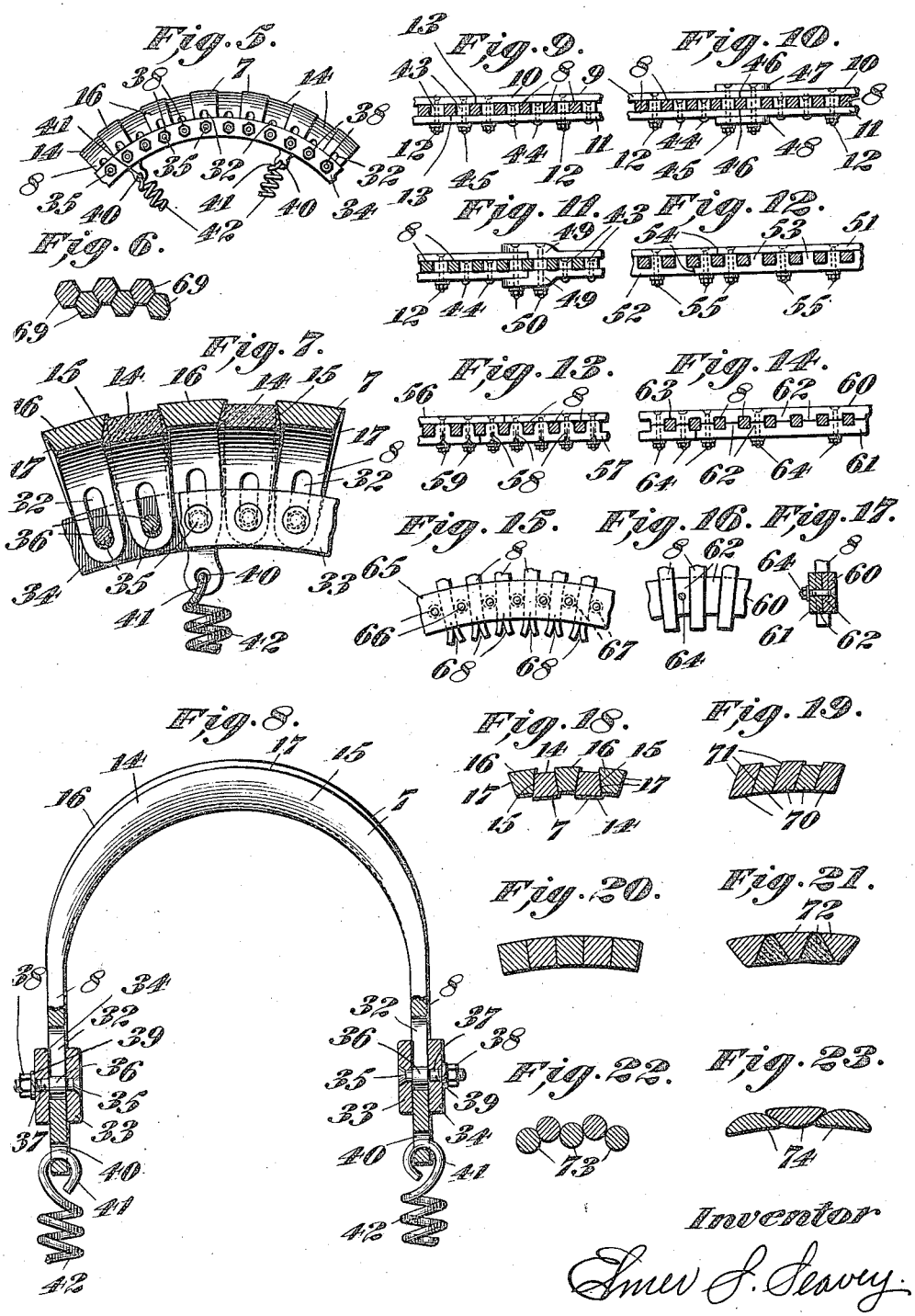

ELMER S. SEAVEY, OF JOHNSTOWN, PENNSYLVANIA.

ARMORED WHEEL TREAD.

1,424,524.  Specification of Letters Patent.  Patented Aug. 1, 1922.

Application filed July 14, 1920. Serial No. 396,256.

*To all whom it may concern:*

Be it known that I, ELMER S. SEAVEY, a citizen of the United States, and residing in the city of Johnstown, in the county of Cambria and State of Pennsylvania, have invented certain new and useful Improvements in Armored Wheel Treads; and I do hereby declare the following to be a full, clear, and exact description of the invention, such as will enable others skilled in the art to which it appertains to make and use the same.

My invention relates to armored pneumatic tires for vehicle wheels, and one of its objects is to provide a protective metallic tread member or shoe that will embrace the entire tread portion of a pneumatic tire, and positively protect the latter from being punctured or cut.

Another object of my invention is to enable the wheels to grip the ground firmly and for preventing slipping when traveling over slippery or uneven roads and ascending or descending steep inclines.

A further object of the invention is to provide a simple, inexpensive and efficient attachment to the periphery of the usual pneumatic tires used for automobiles and other horseless vehicles, adapted to be compactly carried within such a vehicle and capable of being quickly applied to and removed from the wheels thereof.

The invention also has for its object to provide a device of the character which will not necessitate any alterations in the construction of the wheel, or mar the finish thereof, and which will be cushioned by the elastic or pneumatic tire, and thereby enable the vehicle to run substantially as smoothly with the attachment as without.

Another object of my invention is to effectually prevent the device from slipping or becoming loose when it strikes the ground and is subjected to the weight of a vehicle and when the tire is partially compressed by such weight.

A further object of my invention resides in forming the protective tread of a plurality of units of similar formation and of segmental or arc-shaped sections with side friction faces, preferably beveled, although they may be made oval, inclined, circular, straight or otherwise if desired, which can be easily replaced when broken or worn, or for any other reason.

Another object of my invention relates to means for holding the friction side faces at all times in contact with each other and thereby insuring protection of the inner tube of the wheel, and also holding the segmental or arc-shaped units always in contact with the rubber shoe of the pneumatic tire of the wheel.

A further object relates to the manner I have of holding the ends of the segmental or arc-shaped units in position.

With these and other objects in view the invention consists in the construction and novel combination and arrangement of parts, hereinafter more fully described, illustrated in the accompanying drawings, and pointed out in the claims hereto appended.

Having thus given a general description of my invention, I will now, in order to make the same more clear, refer to the accompanying two sheets of drawings in which like characters of reference indicate like parts:—

Figure 1 is a side elevation of a vehicle-wheel showing one form of my improved armored wheel tread or grip applied thereto, and in operative position.

Figure 2 is a side elevation of a vehicle-wheel similar to Figure 1 but showing a slightly modified form of my invention.

Figure 3 is a vertical transverse sectional elevation of Figure 1 of the rim, tire and armor, taken on the line of one of the take-up springs.

Figure 4 is a vertical transverse sectional elevation of Figure 2 of the rim, tire and armor, taken on the line of one of the take-up springs in the modified form.

Figure 5 is a side elevation of a portion of another modified form of an armored tread I may use.

Figure 6 is a detail in section, showing the arrangement of an armored tread made of hexagonal shaped members.

Figure 7 is a vertical sectional elevation of the armored wheel tread shown in Figure 5.

Figure 8 is a vertical transverse sectional elevation of the modification of the armored wheel tread shown in Figure 7, but drawn on a larger scale, the lower end of the segmental arc-shaped unit or member being broken away to more clearly illustrate the manner of construction.

Figures 9, 10, 11, 12, 13 and 14, illustrate different forms of ring-holders, holding the ends of the segmental arc-shaped members, and also showing different ways of connecting the ends of the ring-holders together when the armored tread is applied to the pneumtic tires of the wheel.

Figure 15 is a detail in side elevation showing the ends of the arc-shaped armored tread members split and spread apart, to prevent them from falling out of the ring holder.

Figure 16 is a central longitudinal sectional elevation of a portion of the ring-holder shown in Figure 14, showing the ends of the arc-shaped armored tread members straight.

Figure 17 is a transverse section of one of the ring-holders shown in Figure 14 and 16, the section being taken on the line of one of the bolts which secure the two halves of the ring-holder together.

Figures 18, 19, 20, 21, 22 and 23 illustrate in detail cross-section the arrangements of different shapes which I may use in constructing the armored tread.

Referring now to the characters of reference on the drawings; and more especially to Figures 1 and 3, the numeral 1 indicates the hub, 2 the spokes, 3 the felly, and 4 the rim of a vehicle wheel. Said wheel is of an ordinary construction and carries the usual pneumatic tire, consisting of a casing 5, and inner tube 6.

The tread portion of the tire is embraced by a sectional metallic armor, comprising a plurality of concavo-convex sections 7, having straight end portions 8, which are held in position by means of a pair of ring-holders 9, disposed on either side of the rim of the wheel. These ring-holders 9 are each composed of an inner and outer annular ring member 10 and 11 respectively, held together by means of rivets or bolts 12, and jointed as at 13, so they can be easily removed or attached to the tread of the wheel when desired.

The concavo-convex sections 7, forming the metallic armor, have their side edges beveled around the tread portion of the wheel, every other one being a female member 14, and is beveled outwardly as at 15, while the intervening members 16 are male having their side edges beveled inwardly as at 17 for frictionally engaging the beveled edges 15 of the female members.

A certain number of the male members 16 have their straight end portions 8 extending inwardly beyond the ring-holder 9, and are formed with projections 18, with eyes 19 therein for receiving the hooked end 20 of the take-up springs 21. These springs 21 have their inner ends each formed with a hook 22, and secured to a ring 23. In the drawings I have shown for illustration, six of these take-up springs, although two or more may be used without departing from the spirit of the invention.

I prefer to have the tread of the metallic armor notched or grooved as at 24, although it may be made smooth if desired, and to have the male members extend beyond the female members, so as to allow for greater frictional resistance when the weight of the vehicle is sustained by the lower tread surface of the wheel.

The take-up springs 21 hold the beveled edges of the armor sections at all times in contact with each other, while the straight ends 8 of the male and female sections between the take-up springs are bent at right angles thereto as at 25, to limit the sections in their outward movement and to prevent them from falling out in case of wear or for any other cause.

In Figures 2 and 4 I have shown a slightly modified form of take-up device in which a certain number of the male concavo-convex sections having their straight ends, which extend through the ring-holders formed cylindrical as at 26, with a helical spring 27 mounted upon their inner ends between the ring-holders and the ends of the sections, between washers 28 and 29, and held in position by nuts 30. These springs hold the concavo-convex sections always in a yielding position around the tread of the wheel, and to prevent the nuts 30 from falling off the extreme ends of the sections may be split as at 31. Otherwise the construction is similar to that shown in Figures 1 and 3 and will receive the same reference numerals.

In Figures 5, 7 and 8 I have shown another modified form of metallic armor, in which the straight ends of the concavo-convex sections are made slotted as at 32, and held between the inner and outer ring sections 33 and 34, by means of bolts 35. The heads of said bolts being retained by the inner ring 33, and preferably formed with a collar 36 on each bolt which extends through the slot 32 in the side of the sections, and forms a shoulder for spacing the inner and outer ring members together, allowing the slotted ends of the sections to slide loosely between the inner and outer ring members at all times and prevent binding. The outer ends of the bolts 35 are screw-threaded and extend through holes 37 in the outer ring member 34, and each have a nut 38 and a lock-washer 39 thereon for holding the ring-holders together, as clearly shown in Figure 8 of the drawings.

In the construction shown in Figures 5, 7 and 8, I prefer to have the ends of the concavo-convex sections stop short of the inner circumference of the ring-holders, and not extend inward beyond the same, with the exception of the ones to which the take-up springs are attached, which extend inward beyond the inner circumference of the ring-holders and are each formed with an eye 40, for receiving the hooked end 41, of the take-up springs 42.

In Figures 9, 10, 11, 12, 13, 14, 15, 16 and

17 I have shown different ways of constructing the ring-holders and the manner of securing the sections together. In Figure 9 the ring-holder is similar to that shown in Figures 1 to 4, both inclusive, in which the ring-holder 9, has an inner ring 10 and an outer ring 11, spaced apart at intervals by means of blocks 43, which are attached to the inner or outer rings 10 and 11, by means of rivets 44 and bolts 12, the joint 13 in the inner and outer rings being in staggered relation to each other, so it is only necessary to remove the bolt 45, and the corresponding bolt on the other side of the ring-holder to take the two halves of the armored wheel tread apart as will be clearly understood by referring to Figures 2 and 9 of the drawings.

In Figure 10 I have shown the ring-holders made similar to Figure 9, but in this ring-holder the joint 46 is made with the ends of the rings opposite each other, and are attached together by means of splice plates 47 and 48.

In Figure 11 one end of the inner and outer ring is formed with an enlarged or offset portion 49, through which splice bolt 50 pass for securing the ends of the ring sections together.

In Figure 12 I have illustrated a ring-holder with an inner ring 51 and an outer ring 52, the outer ring having the spacing blocks 53 formed integral therewith, and the joint 54 in the inner and outer ring is made in staggered relation to each other, and the two rings being bolted together by means of the bolts 55.

In Figure 13 I have shown a ring-holder with an inner ring 56 and an outer ring 57, crimped as at 58, to form the spacing blocks, the ring being secured together by bolts 59, the joint in the inner and outer rings being formed in staggered relation to each other.

In Figures 14, 16 and 17, I have shown a ring-holder in which the inner and outer rings 60 and 61 are made with offset portions 62, between which the ends 8, of the concavo-convex sections are held in position. The jointed ends 63 of the rings being formed in staggered relation to each other, and the inner and outer rings being secured together by means of bolts 64.

In Figure 15 I have shown the ring-holder 65, in which the inner and outer ring may be secured by means of rivets 66, with sleeves 67 on the rivets, between the inner and outer rings for spacing the two apart, while the ends 8 of the concavo-convex sections are split as at 68, to prevent them from falling out.

In Figures 6, 18, 19, 20, 21, 22 and 23 I have illustrated in transverse sections, different forms of concavo-convex members I may use as follows:— In Figure 6 the units from which the armored wheel tread is constructed is of hexagonal sections as indicated by the numeral 69. In Figure 18 the cross-section of the units are similar to those described in Figures 1, 2, 4, 5, 7 and 8, and needs no further description. In Figure 19 I have illustrated the armored wheel tread formed of units 70, having its top and bottom surfaces parallel and with inclined friction edges 71, and preferably every other one extending slightly above the intervening unit. In Figure 20 I have shown units substantially square in cross-section. In Figure 21 I have illustrated units 72 of triangular cross-section. In Figure 22 units 73 of circular cross-section, and in Figure 23 I have shown another form of a unit 74, I may use, being a half-oval section.

Other modifications of concavo-convex units may be used without departing from the spirit of the invention.

I also wish it understood that I may make the concavo-convex sections of different material, as for instance, I may form the male sections or units of hard material, such as steel, or the like and the female sections or units of a softer metal or composition, as indicated in Figures 7 and 21 of the drawings, and although I have shown the inner ends of the take-up springs attached to a ring, I may attach them to the hub or central portion of the wheel.

Although I have shown and described my invention in considerable detail, I do not wish to be limited to the exact and specific details shown and described, but may use such substitutions, modifications or equivalents thereof as are embraced within the scope of my invention or as pointed out in the claims.

Having thus described my invention what I claim and desire to secure by Letters Patent is:—

1. In a grip-tread for elastic tires, comprising a plurality of friction members surrounding the elastic tire and slidably engaging ring-holders on each side of the elastic tire, means independent of the ring-holders for holding the side edges of the friction members in contact with each other, and means for holding the friction members in contact with the tread of the wheel.

2. In a grip-tread for elastic tires, comprising a plurality of friction members surrounding the elastic tire and slidably engaging ring-holders on each side of the elastic tire, resilient means independent of the ring-holders for holding the side edges of the friction members in contact with each other, and resilient means for holding the friction members in contact with the tread of the wheel.

3. In a grip-tread for elastic tires, comprising a plurality of members having inclined friction side faces around the tread of the elastic tire and slidably engaging ring-holders on each side of the elastic tire independent of the ring-holders for holding the inclined friction side faces always in contact with each other, and resilient means for holding the plurality of members always in contact with the tread of the elastic tire.

4. In a grip-tread for elastic tires, comprising a plurality of concavo-convex sections surrounding the tread of the elastic tire and having friction side edges, said concavo-convex sections having straight end portions slidably mounted in ring-holders, resilient means for holding the friction side faces of the concavo-convex sections always in contact with each other, and means for holding the concavo-convex sections always upon the elastic tread of the tire.

5. In a grip-tread for elastic tires, comprising a plurality of concavo-convex metallic sections surrounding the tread of the elastic tire and having friction side faces engaging each other, said concavo-convex sections having straight end portions adapted to be slidably held in ring-holders on either side of the wheel, a plurality of the straight ends of the concavo-convex sections each having an eye formed therein, one end of a spring attached to the eye, and means for holding the opposite end of each spring centrally of the wheel.

6. In a grip-tread for elastic tires, comprising a plurality of concavo-convex sections, ring-holders each having an inner and outer ring adapted to hold each of the ends of the concavo-convex sections, and springs attached to a plurality of the ends of the concavo-convex sections, and means near the center of the wheel for holding the opposite ends of the springs attached to the concavo-convex sections.

7. In a grip-tread for elastic tires, comprising a plurality of concavo-convex sections each having straight end portions, ring-holders adapted to slidably hold the straight ends of the concavo-convex sections, said ring-holders each having an inner and outer ring secured together, springs attached to each of the inner ends of a plurality of the straight ends, and a ring for holding the opposite ends of the springs near the center of the wheel.

8. In a grip-tread for elastic tires, comprising a plurality of concavo-convex sections, ring-holders on each side of the wheel adapted to slidably hold the ends of the concavo-convex sections, said ring-holders each having an inner and outer ring secured together between which the straight ends of the concavo-convex sections are slidably mounted, a joint formed in the ring-holders, and resilient means for holding the concavo-convex sections upon the wheel tread.

9. In a grip-tread for elastic tires, comprising a plurality of concavo-convex section having end portions with slots formed therein, ring-holders on each side of the wheel adapted to slidably hold the ends of the concavo-convex sections, said ring-holders each having an inner and outer ring spaced apart and secured together by conecting means which pass through the slots formed in the ends of the concavo-convex sections, and resilient means for holding the concavo-convex sections together upon the wheel tread.

10. In a grip-tread for elastic tires, comprising a plurality of concavo-convex sections with friction sides engaging each other, said concavo-convex sections having end portions with slots formed therein, ring-holders on each side of the wheel adapted to slidably hold the ends of the concavo-convex sections, said ring-holders each having an inner and outer ring spaced apart and secured together by bolts which pass through the slots formed in the ends of the concavo-convex sections, and resilient means for holding the friction sides of the concavo-convex sections together upon the wheel tread.

11. In an armored tire, comprising an elastic tire, a plurality of concavo-convex sections surrounding the elastic tire, ring-holders between which the ends of the concavo-convex sections are slidably held, and resilient means for normally holding the concavo-convex sections in contact with the tread of the elastic tire.

12. In an armored tire, comprising an elastic tire, a plurality of concavo-convex sections radially mounted upon the elastic tire, ring-holders each having an inner and outer ring member on each side of the elastic tire for holding the ends of the concavo-convex sections, and resilient means attached to the ends of the plurality of the concavo-convex sections for normally holding the concavo-convex sections in contact with the tread of the elastic tire.

13. In an armored tire, comprising an elastic tire, a plurality of concavo-convex sections with straight end portions surrounding the elastic tire, ring-holders each having an inner and outer ring member connected together on each side of the elastic tire for holding the straight ends of the concavo-convex sections, a spring attached to the ends of a plurality of the concavo-convex sections, and a ring adapted to hold the opposite ends of the springs.

14. In an armored tire, comprising an elastic tire, a plurality of concavo-convex sections surrounding the elastic tire having slotted straight end portions, a ring-holder each having an inner and outer ring member connected together on each side of the elastic tire, means passing through the slots in the ends of the concavo-convex sections and the ring-holders for holding the concavo-convex sections, a spring attached to the ends of a plurality of the concavo-convex sections, and a ring located centrally of the wheel adapted to hold the opposite ends of the springs.

15. In an armored tire, comprising an elastic tire, a plurality of concavo-convex sections surrounding the elastic tire having slotted straight end portions and friction side faces around the tread of the wheel, a ring-holder on each side of the elastic tire, each ring-holder composed of a pair of annular rings between which the slotted straight ends of the concavo-convex sections are slidably held by means of connections between the annular rings which pass through the straight slotted ends of the concavo-convex sections, a spring attached to the ends of a plurality of the concavo-convex sections, and a ring located centrally of the wheel adapted to hold the opposite ends of the springs.

16. In an armored tire, comprising an elastic tire, a plurality of concavo-convex sections surrounding the elastic tire having slotted straight end portions and overlapping friction side faces around the tread of the wheel, a ring-holder on each side of the elastic tire, each ring-holder composed of a pair of annular rings spaced apart between which the slotted straight ends of the concavo-convex sections are slidably held by means of bolts which pass through the straight slotted ends of the concavo-convex sections and connect the rings together, eyes formed in the inner ends of a plurality of the concavo-convex sections, a helical spring attached to the eye of each of the plurality of inner ends of the concavo-convex sections, and a ring located centrally of the wheel adapted to hold the opposite end of the springs.

17. In an armored tire, comprising an elastic tire a plurality of concavo-convex sections surrounding the elastic tire having slotted straight end portions and inclined contacting friction side faces around the tread of the wheel a ring holder on each side of the elastic tire, each ring-holder composed of a pair of annular rings, shoulder bolts for attaching the pair of anular rings together in spaced relation with each other, said shoulder bolts passing through the slots in the slotted straight ends of the concavo-convex sections, eyes formed in the inner ends of a plurality of the concavo-convex sections, a helical spring attached to the eye of each of the plurality of inner ends of the concavo-convex sections, and a ring-holder located centrally of the wheel adapted to hold the opposite ends of the springs.

18. In an armored tire, comprising an elastic tire, a plurality of concavo-convex sections having contacting friction side faces surrounding the elastic tire, every other concavo-convex section being a male section with its tread surface normally of greater circumference than the intervening female section, ring-holders for holding the ends of the concavo-convex sections, means for holding the friction side faces of the concavo-convex sections at all times in contact with each other, and means for normally holding the concavo-convex sections in contact with the tread of the elastic tire.

19. In an armored tire, comprising an elastic tire a plurality of concavo-convex sections having contacting friction side faces surrounding the elastic tire, every other concavo-convex section being a male section with its tread surface normally of a greater circumference than the intervening female section, and every other section being made of a different material than the intervening section, ring-holders for holding the ends of the concavo-convex sections, and resilient means for normally holding the concavo-convex sections in contact with the tread of the elastic tire.

20. In an armored tire, comprising an elastic tire, a plurality of friction members surrounding the elastic tire, every other friction member being made of softer material than the intervening section, a ring-holder on each side of the elastic tire for holding the ends of the friction members, each ring-holder being composed of an inner and outer annular ring attached together, a joint formed on each side of the ring-holder, the ends of the inner and outer annular ring, forming each ring-holder, being made in staggered relation to each other, means for preventing the friction members from falling out of the ring-holder, and resilient means for normally holding the friction members in contact with the elastic tire.

In witness whereof I hereunto affix my signature.

ELMER S. SEAVEY.